US005754013A

United States Patent [19]

Praiswater

[11] Patent Number: 5,754,013

[45] Date of Patent: May 19, 1998

[54] APPARATUS FOR PROVIDING A NONLINEAR OUTPUT IN RESPONSE TO A LINEAR INPUT BY USING LINEAR APPROXIMATION AND FOR USE IN A LIGHTING CONTROL SYSTEM

[75] Inventor: Michael Ross Praiswater, Albuquerque, N. Mex.

[73] Assignee: Honeywell Inc., Minneapolis, Minn.

[21] Appl. No.: 774,670

[22] Filed: Dec. 30, 1996

[51] Int. Cl.[6] .......................... H05B 41/36; G06F 7/556

[52] U.S. Cl. .......................... 315/307; 315/149; 327/346; 327/350

[58] Field of Search .......................... 327/334, 335, 327/336, 346, 350, 352; 315/149, 150, 151, 156, 157, 158, 159, 291, 307, 308; 330/250, 207 R

[56] References Cited

U.S. PATENT DOCUMENTS

| | | | |
|---|---|---|---|
| 4,980,584 | 12/1990 | Goff et al. | 307/492 |
| 4,990,803 | 2/1991 | Gilbert | 307/492 |
| 5,027,034 | 6/1991 | Ruby et al. | 315/106 |
| 5,258,323 | 11/1993 | Sarma et al. | 437/63 |
| 5,489,868 | 2/1996 | Gilbert | 327/351 |
| 5,506,537 | 4/1996 | Kimura | 327/351 |

*Primary Examiner*—Robert Pascal
*Assistant Examiner*—David H. Vu
*Attorney, Agent, or Firm*—Kenneth J. Johnson; Andrew A. Abeyta

[57] ABSTRACT

An amplifier which outputs a nonlinear function in response to a linear input. The nonlinear response is a piece-wise linear approximation. The circuit includes an op amp which outputs a ramping voltage and a series of stages which change the scope of the ramping voltage. As the output of the op amp reaches a particular breakpoint, an additional stage of the circuit is activated so as to change the slope of the output. The new line segment has a new slope such that the combination of all these stages approximates a nonlinear response.

16 Claims, 7 Drawing Sheets

SOLUTION

APPARATUS FOR PROVIDING A NONLINEAR OUTPUT IN RESPONSE TO A LINEAR INPUT BY USING LINEAR APPROXIMATION AND FOR USE IN A LIGHTING CONTROL SYSTEM

The United States Government has acquired certain rights in this invention through Government Contract No. F33657-90-C-2233 awarded by the Department of the Air Force.

FIELD OF THE INVENTION

The invention relates to amplifiers which provide a non-linear response, and more specifically, to providing a linear piece-wise approximation of a nonlinear function.

BACKGROUND OF THE INVENTION

Liquid crystal displays with fluorescent backlights have a variety of uses which range from laptop computers to aircraft cockpit displays. The ability to view these displays is affected by the ambient lighting in the environment in which the display is operating. For example, in a cockpit, the operating environment ranges from nearly pitch black dark to the sun shining directly on a display. At both these extremes, the pilot must be able to easily read the display without the display either being too dim or too bright. To compensate for the changes in the ambient conditions, the amount of light output by the backlight is varied.

It is desirable that when power is either increased or decreased to the backlight that the change in brightness appear linear to the viewer. A linear change in brightness is desirable because the display is then not a distraction to the pilot as it changes brightness, and if the brightness needs to be changed manually by the pilot, it is easier if the brightness changes in a linear fashion. A difficulty which is encountered when trying to provide a backlight which changes brightness in a linear fashion is how the human senses perceive these changes in brightness. It is well known that in order for the changes in brightness to appear linear to the viewer, the intensity of the light source must increase according to an exponential function.

In order to drive the backlight and give the perception of linearity, a logarithmic amplifier is used which outputs a logarithmic function of a linear input. One solution is to provide an amplifier which generates a piece-wise linear approximation of a logarithmic function. An amplifier of this type outputs voltages which increase linearly between designated breakpoints. When a breakpoint is reached, the slope of the voltage increase is changed.

An example of a prior art circuit which provides this capability is shown in FIG. 1. In this circuit, the linear input to change the output voltage is received at input 13. An offset voltage is also received at input 15. The gain of op amp 12 is controlled by resistor 14 and resistor 17. The feedback of op amp 12, the input voltage, and the offset voltage, are all combined at the inverting input of op amp 12. The non-inverting input is connected to ground. As the input voltage increases, the output of the op amp 12 increases in a linear fashion. The voltage at the op amp output is placed across zener diodes 22, 24, and 26. The zener diodes 22, 24, and 26, are aligned in the circuit to break down in a cascading fashion. As the voltage at the output of the op amp 12 increases, zener diode 26 is the first to break down and the current through the diode is then received at the inverting input of the op amp. This additional current changes the slope of the output of the op amp. As certain threshold voltages are reached at each of these zener diodes, they break down, thus changing the gain of op amp 12 making the output of the circuit a piece-wise linear approximation of a logarithmic function.

The main disadvantage of the circuit shown in FIG. 1 is that the initial tolerance of the zener diode breakdown voltage can vary from 5% to 20%. The temperature sensitivity of these diodes can easily double the initial tolerance. Because of the zener diode breakdown voltage tolerance, this is a low performance circuit with a very high output voltage tolerance. Other solutions have been used which have a discreet approach with matched transistors in the feedback path of an op amp. An analog divider IC is used to cancel out temperature sensitivity. Although this circuit does have good performance, it does require gain and offset calibration and has a cost that is prohibitive.

Therefore, an object of the present invention is to provide a logarithmic amplifier which is inexpensive, insensitive to heat, and does not require gain and offset calibration.

SUMMARY OF THE INVENTION

Described herein is an amplifier which converts a linear input signal to a nonlinear output signal. The output signal is a piece-wise linear approximation of a nonlinear function. The circuit includes a first stage and a plurality of additional stages. The accuracy of the output is controlled by the number of additional stages. The first stage includes a first stage op amp with a non-inverting output at ground and an inverting input which receives the linear input signal, the offset voltage, and feedback from the first op amp output. The first op amp outputs a voltage which is proportional to the voltage necessary to run the fluorescent backlight or any other device which requires this type of amplifier. Also at the output of the first stage op amp is a feedback resistor which controls the gain of the first stage op amp. This first stage outputs a voltage which rises at a known slope in relation to the linear input signal.

Each additional gain stage includes an op amp with an inverting input, a non-inverting input, and an output voltage. A control resistor is positioned between the first stage and the inverting input of the additional stage op amp. A reference voltage is input into the non-inverting input of the op amp. A switching means is connected to the output of the op amp. The switching means is activated when the voltage at the inverting input of the additional gain stage op amp is greater than the reference voltage at the non-inverting input. The switching means directs current flowing through the control resistor at the stage to the inverting input of the first stage op amp. This changes the slope of the first stage op amp output voltage. Each time a switching means in each additional stage is turned on, the slope changes. This creates a piece-wise linear approximation of a nonlinear function at the output of the first stage op amp.

Two separate embodiments of the amplifier are described herein. In one embodiment of the amplifier, a logarithmic function is output. In a second embodiment, an exponential function is output. The main difference between the two circuits is the type of signal which is transmitted to the inverting input of the additional stage op amp. In the logarithmic amplifier, the first stage op amp output is put across a resistor and is received at the inverting input of the additional stage op amp. In the exponential amplifier, the input voltage is put across a resistor and is received at the additional stage op amp inverting input.

DESCRIPTION OF THE PREFERRED EMBODIMENTS

Figure 1:
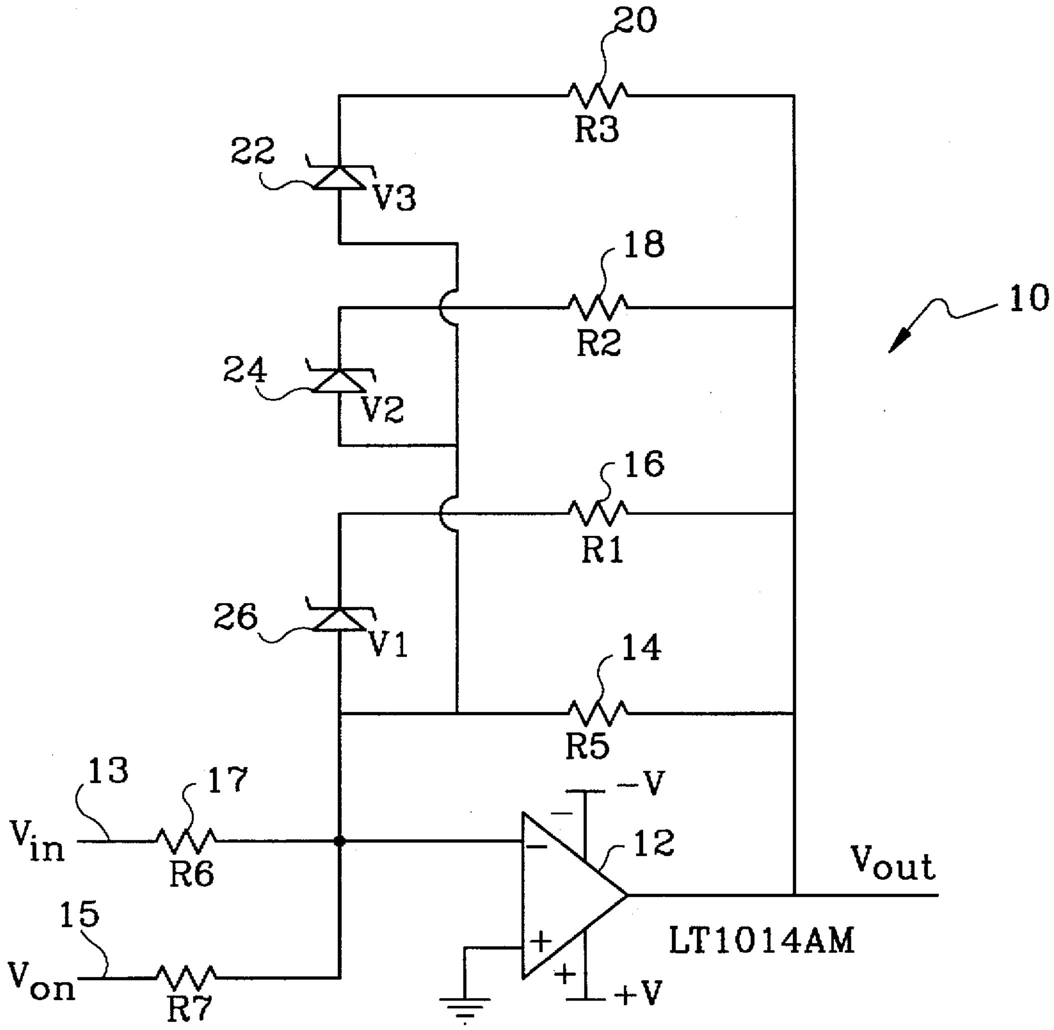
Fig. 1 (PRIOR ART)
FIG. 1 is a circuit diagram of a prior art logarithmic amplifier.
Figure 2:
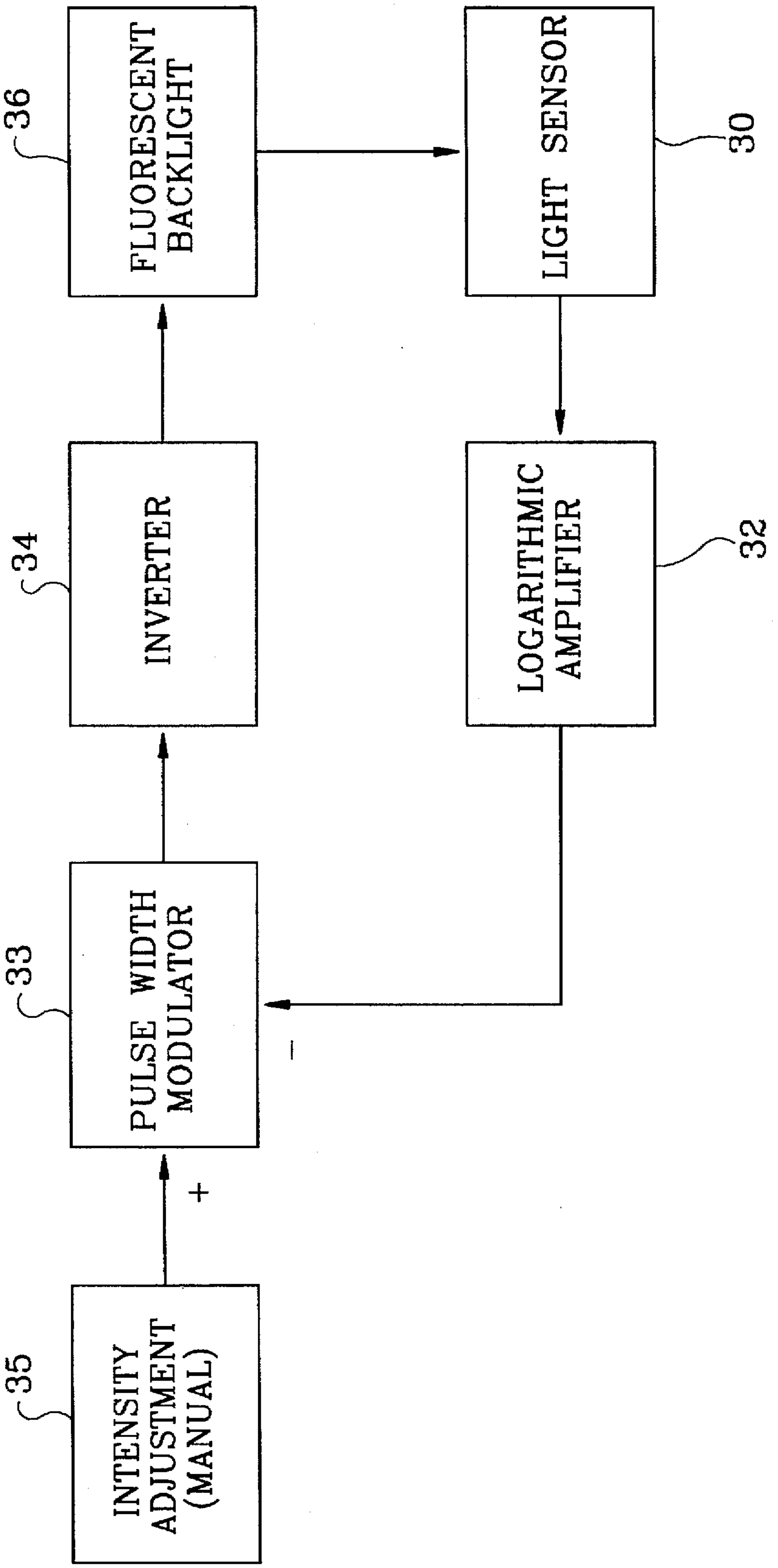
FIG. 2 discloses a system diagram for a fluorescent backlight where the dimming portion of the system uses a logarithmic amplifier.

Shown in FIG. 2 is one embodiment of a backlight system for a liquid crystal display. In many liquid crystal display applications, it is necessary to have the display lighting change due to changes in the ambient conditions around the display. As the exterior lighting gets brighter, so should the backlight and vice-versa. In order to increase or decrease the brightness, the pilot makes a manual adjustment through intensity adjustment 35. A signal from the intensity adjustment 35 is transmitted to the pulse width modulator 33. The signal from the intensity adjustment is at a level which is proportional to the desired intensity of the backlight. The pulse width modulator 33 converts this input signal into a pulse with a width that is proportional to the desired intensity of the backlight. These periodic pulses are transmitted to inverter 34 which outputs a signal of sufficient amplitude in order to drive the backlight at the desired intensity. The backlight 36 in this case is a fluorescent light which is common in liquid crystal displays. Photodiode 30 is positioned in the backlight cavity of the display and is used as an input to the optical feedback control system. The optical feedback control system maintains the backlight intensity while compensating for variations due to temperature fluctuations and aging degradation. The output of the photodiode 30 is transmitted to logarithmic amplifier 32. The logarithmic amplifier converts the linear signal output from the light sensor 30 into a logarithmic function which is then combined with the manual intensity adjustment at pulse width modulator 33.

In order for the display to operate in a manner which is not distracting to the user and is easy to adjust, power must be provided to the fluorescent backlight in a manner such that any changes in intensity of the backlight appear linear to the viewer. In order to increase the brightness of the backlight in a fashion which appears linear to the viewer, the actual power increase must be an exponential function. It is a peculiarity of the human senses that things such as sight and sound need to increase exponentially in intensity for them to appear to be linear. As such, a logarithmic amplifier is provided which converts the linear inputs from the photodiode 30 to a logarithmic function for increasing or decreasing the fluorescent backlight output.

One solution to the logarithmic amplifier problem is to provide an amplifier which outputs a log function as a series of piece-wise linear segments. In prior art devices which use this type of approximation, a series of zener diodes have been used in combination with an op amp. The zener diodes each have a different breakdown voltage and by taking advantage of these characteristics the slope of the ramping output of the op amp can be changed so as to provide an approximation of a logarithmic function. The disadvantage of this type of set up is that the initial tolerance of the zener diode breakdown voltage can vary from 5% to 20%. Changes in temperature further affect these percentages. Other solutions have been developed, but in most cases they require high costs, cannot comply to military standards, and require gain and offset calibration.

Figure 3:
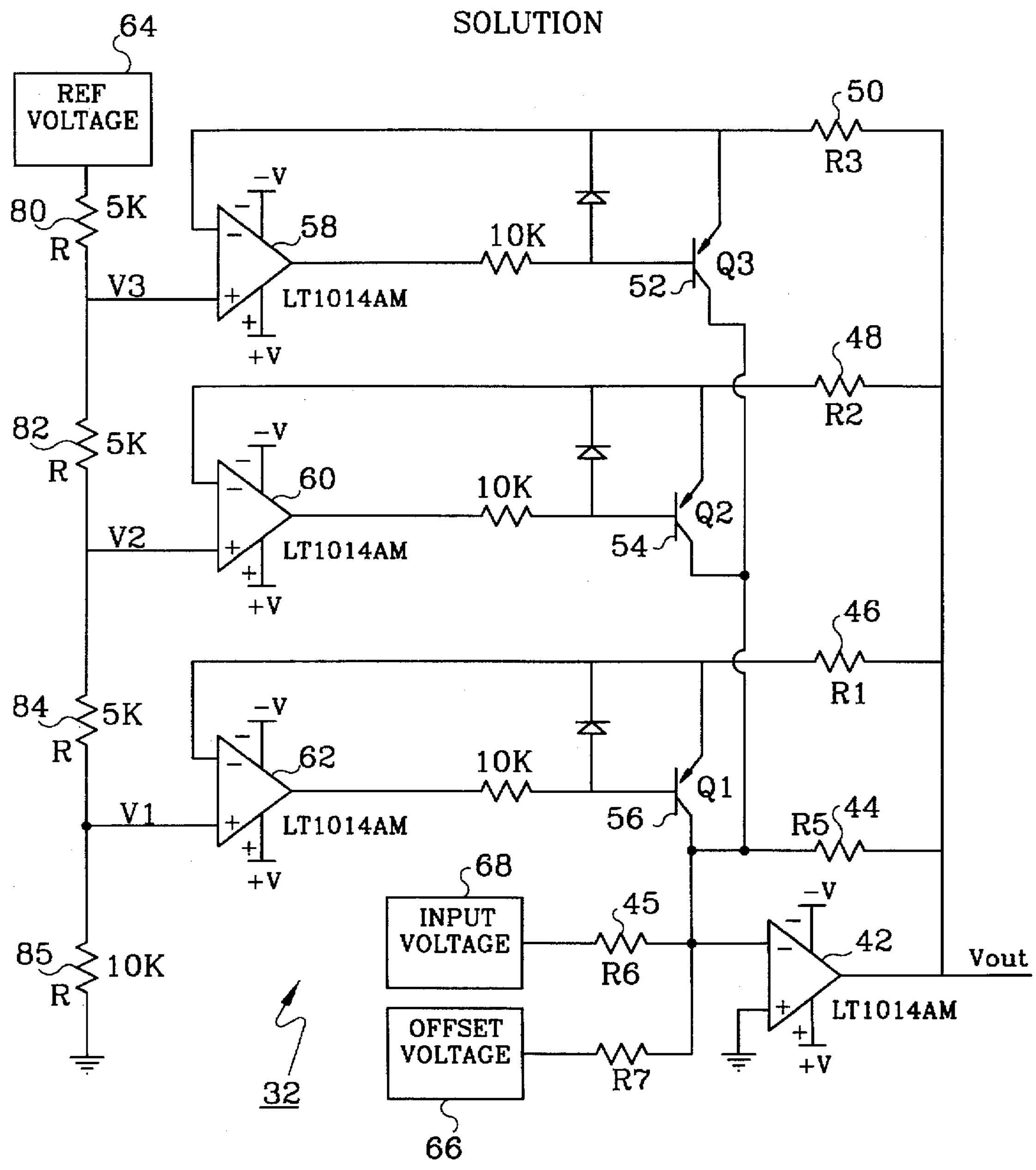
FIG. 3 is a circuit diagram of the logarithmic amplifier.

Disclosed in FIG. 3 is the preferred embodiment of the invention. Described herein is an amplifier which, in response to a linear input signal, outputs a piece-wise approximation of a logarithmic function. The logarithmic amplifier includes an op amp 42 which has inverting and non-inverting inputs. At the inverting input are the input voltage 68, offset voltage 66, as well as a feedback signal. The input voltage is the linear adjustment signal received from an external source such as the light sensor 30. The offset voltage 66 is provided because a logarithmic function cannot equal zero. Without the offset, the output of the circuit will be zero when the input is zero. The output voltage of op amp 42 is transmitted to the pulse width modulator 33. Positioned in a feedback loop to the inverting input of the op amp, is resistor 44. The magnitude of this resistor and resistor 45 controls the gain of first stage op amp 42.

The circuit in FIG. 3 also shows three additional stages for the logarithmic amplifier. Depending on the desired accuracy of the circuit, as many stages as necessary can be added. Connected at the output of the op amp 42 are resistors 46, 48, and 50 in addition to resistor 44. Voltage from op amp 42 runs through these resistors and is received at the inverting inputs of op amps 58, 60, and 62. Received at the non-inverting inputs of op amps 58, 60, and 62 is a reference voltage which is provided by reference voltage source 64. The appropriate reference voltage for each stage is provided as a function of the voltage drop across resistors 80, 82, 84, and 85. The output of op amps 58, 60, and 62 is received at the base of transistors 52, 54, and 56, respectively. The collectors of each of the transistors are connected to the inverting input of first stage op amp 42.

The log approximation amplifier shown in FIG. 3 is a variable gain circuit. The gain of the circuit is dependent on the amplitude $V_{in}$. As the amplitude of $V_{in}$ increases, the gain applied to the signal decreases. The embodiment of the circuit shown in FIG. 3 has four discreet gain stages. Each gain stage generates a line segment in a piece-wise linear approximation of a log function. Gain stages can be added or removed depending on the desired accuracy of the approximation. Each additional gain stage for the circuit in FIG. 3 requires a reference voltage. The reference voltages at op amps 58, 60, and 62 are determined by the resistor values of 80, 82, 84, and 85. Assuming that the reference voltage is five volts, and using the resistor values shown in FIG. 3, the calculated reference voltages are 2 volts (V1) at the non-inverting input of op amp 62, 3 volts (V2) at the non-inverting input of op amp 60, and 4 volts (V3) at the non-inverting input of op amp 58.

The circuit operates by applying a gain to the inverting input of op amp 42. For very low values of $V_{in}$, the $V_{out}$ is less than the voltage at the non-inverting input of op amp 62. $V_{out}$ passes through resistor 44 and is present at the inverting input of op amp 62. The non-inverting input of op amp 62 is driven by V1. When the voltage at the non-inverting input of op amp 62 is greater than the voltage at the inverting input, the output of the op amp rises to positive rail. Under these conditions, transistor 56 is reverse biased and does not contribute any current into the summing junction on the inverting input of first stage op amp 42. Similarly, transistors 52 and 54 are reverse biased and do not contribute any current into the summing junction at the input of first stage op amp 42. When $V_{out}$ is less than the V1, the gain of op amp 42 is a function of resistors 44 and 45.

When $V_{out}$ is above V1 but is less than V2, the first gain breakpoint is active. Op amp 62 begins driving the base of transistor 56, forward biasing the base-emitter junction, until the transistor 56 emitter voltage is equal to V1. Current from the output of op amp 42 flows through resistor 46 and transistor 56 into the inverting input of op amp 42. Since the output voltage of op amp 42 is less than V2, transistors 52 and 54 are still reverse biased and do not contribute any current into the inverting input of op amp 42. As a result, the gain of op amp 42 is a function of resistors 44, 45, and 46.

When the $V_{out}$ is greater than V2 but less than V3, the first and second gain breakpoints are active. Op amp 62 continues to drive the base of transistor 56, regulating the voltage on the transistor emitter to V1. Op amp 60 begins driving the base of transistor 54 forward biasing the base emitter junction until transistor 54 emitter voltage is equal to V2. Current from the output of op amp 42 continues to flow through resistor 46 and transistor 56 into the inverting input of op amp 42. Current also flows through resistor 48 and transistor 54 into the inverting input of op amp 42. Since the output voltage of op amp 42 is less than V3, transistor 52 is still reverse biased and does not contribute any current into the inverting input of op amp 42. As a result, the gain of op amp 42 is a function of resistors 44, 45, 46, and 48.

When $V_{out}$ is above V3, all three gain breakpoints are active. Op amp 62 continues to drive the base of transistor 56, regulating the voltage on the transistor emitter to V1. Op amp 60 continues to drive the base of transistor 54 regulating the voltage on the transistor emitter to V2. Op amp 58 drives the base of transistor 52 forward biasing the base-emitter junction, until the transistor emitter voltage is equal to V3. Current from the output of op amp 42 continues to flow through resistor 44, transistor 56, resistor 48, and transistor 54, into the inverting input of op amp 42. Current also flows through resistor 50 and transistor 52 into the inverting input of op amp 42. As a result, the gain of op amp 42 is a function of resistors 44, 45, 46, 48, and 50.

Figure 4:
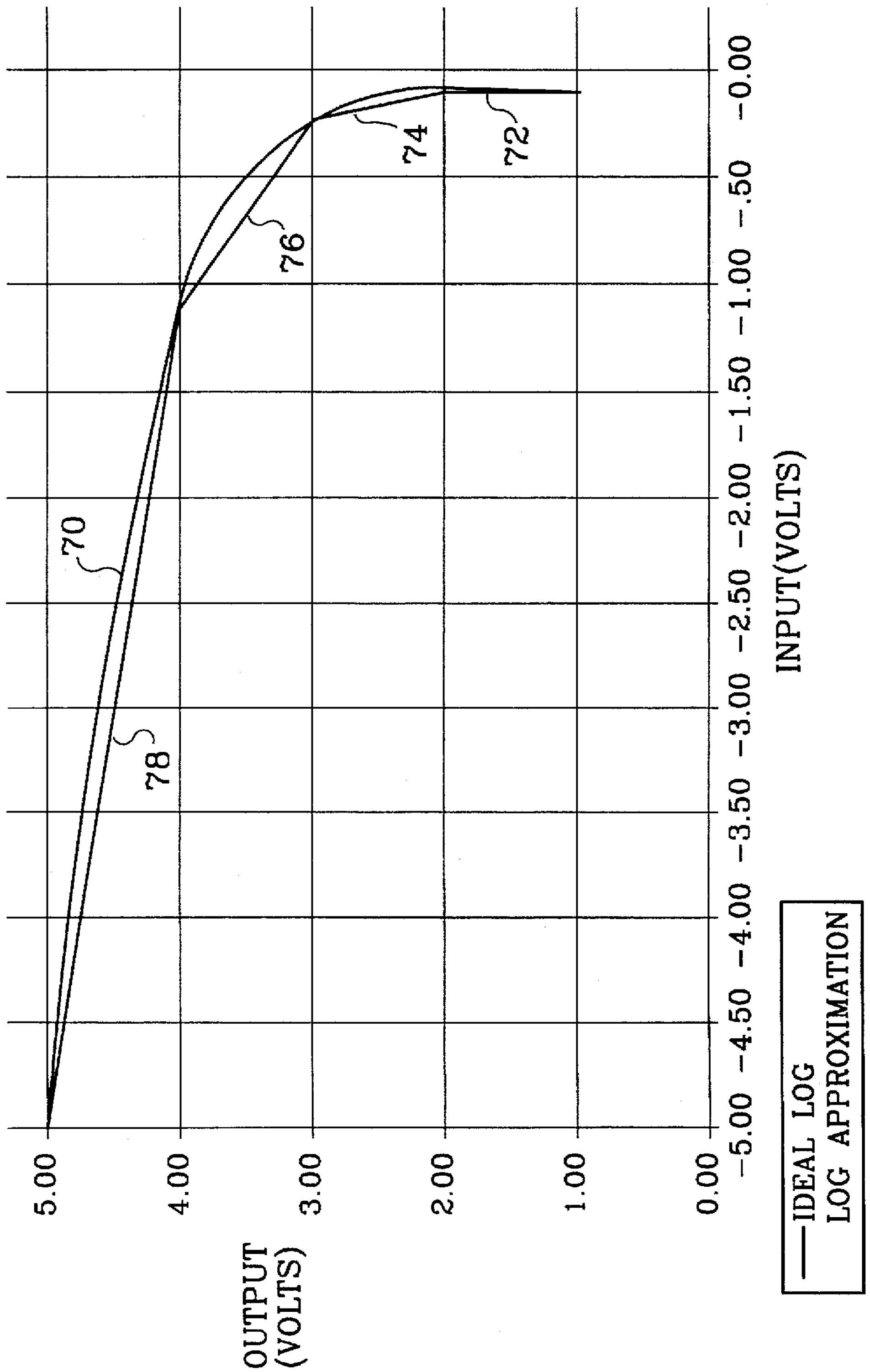
FIG. 4 is a graph comparing the output of the logarithmic amplifier with an ideal logarithmic curve.

The transfer function of the circuit for a voltage of zero to −5 volts is plotted along with an ideal log function 70 in the graph of FIG. 4. The output of the circuit is plotted along the Y axis with the input to the circuit plotted along the X axis. Line segment 72 in the graph shows the performance of the circuit when only resistors 44 and 45 control the gain of the op amp 42 and none of the transistors in the circuit are turned on. Line segment 74 shows the operation of the circuit after the first gain breakpoint is active and transistor 56 is conducting current to the inverting input of op amp 42. At this point the gain of the circuit is controlled by resistors 44, 45, and 46. Line segment 76 shows the operation of the circuit when the first and second gain breakpoints are active. Current is conducted through both transistors 54 and 56 and the gain of the circuit is controlled by resistors 44, 45, and 46 and 48. Finally, line segment 78 shows the operation of the circuit when the first, second, and third breakpoints are active. Current is conducted through transistors 52, 54, and 56 and the gain of op amp 42 is controlled by resistors 44, 45, 46, 48, and 50. As can be seen in the graphs, each stage of the circuit changes the slope of the output of op amp 42 such that the combination of the linear segments closely approximates an actual log function.

Figure 5:
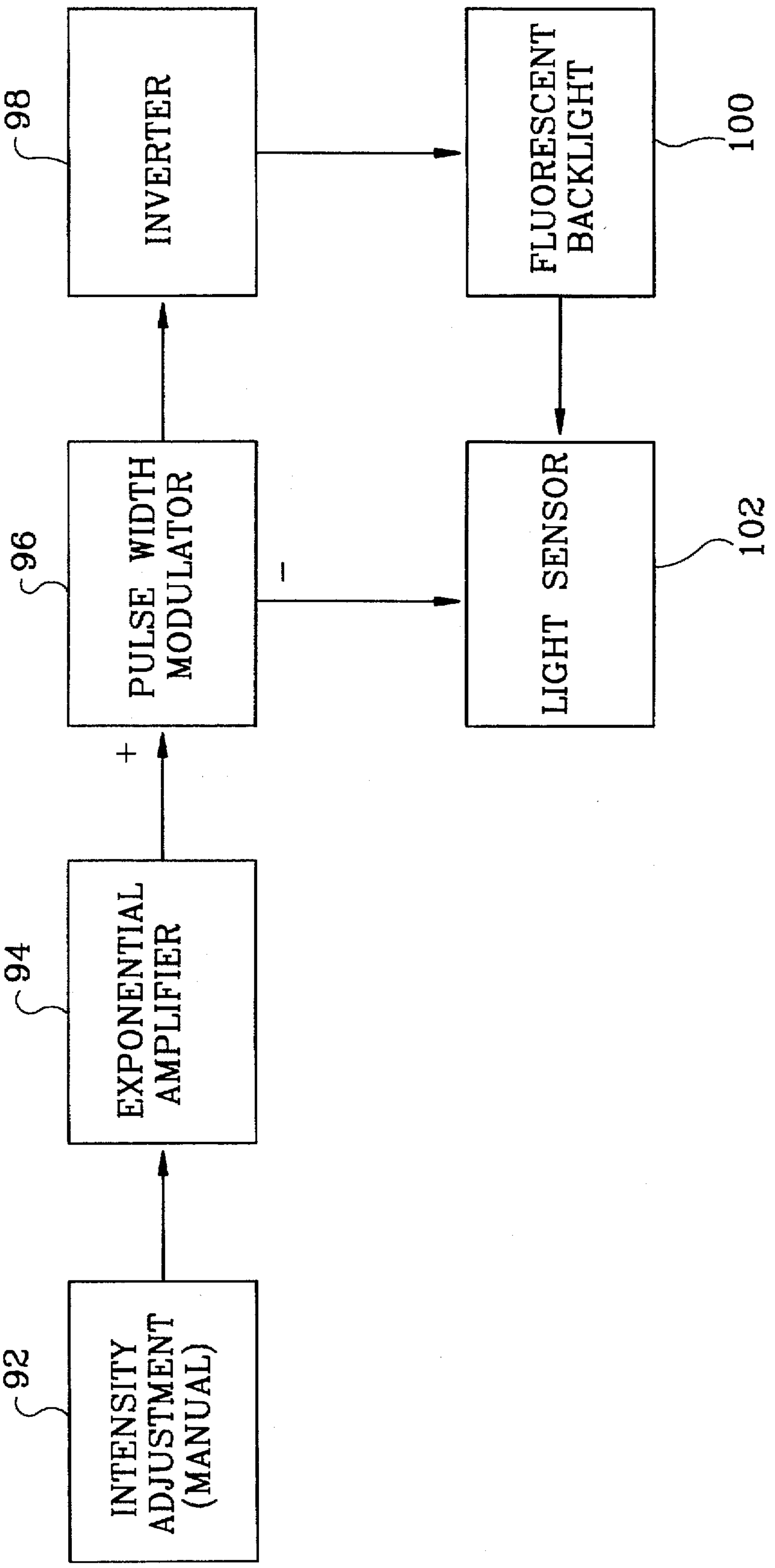
FIG. 5 discloses a system diagram for a fluorescent backlight where the dimming portion of the system uses an exponential amplifier.

An alternate embodiment of the fluorescent backlight dimming circuit is shown in FIG. 5. In this particular circuit, an exponential amplifier is used instead of the logarithmic amplifier. The circuit provides the same output; however, the exponential amplifier is placed in a different position in the circuit. In this circuit, when the pilot wishes to make a manual adjustment of the fluorescent backlight intensity, this is made through intensity adjustment 92. This adjustment signal is then transmitted to exponential amplifier 94. The signal from the exponential amplifier goes into the pulse width modulator 96. Depending on the magnitude of the signal from exponential amplifier 94, the pulse width modulator 96 outputs pulses on a periodic basis where the width of the pulse is dependent on the desired intensity of the fluorescent backlight. Inverter 98 converts the output of the pulse width modulator to a signal which drives fluorescent backlight 100. As in the circuit described in FIG. 2, the light sensor 102 compensates for changes in temperature as well as age degradation. The output from the light sensor is fed back into pulse width modulator 96.

Figure 6:
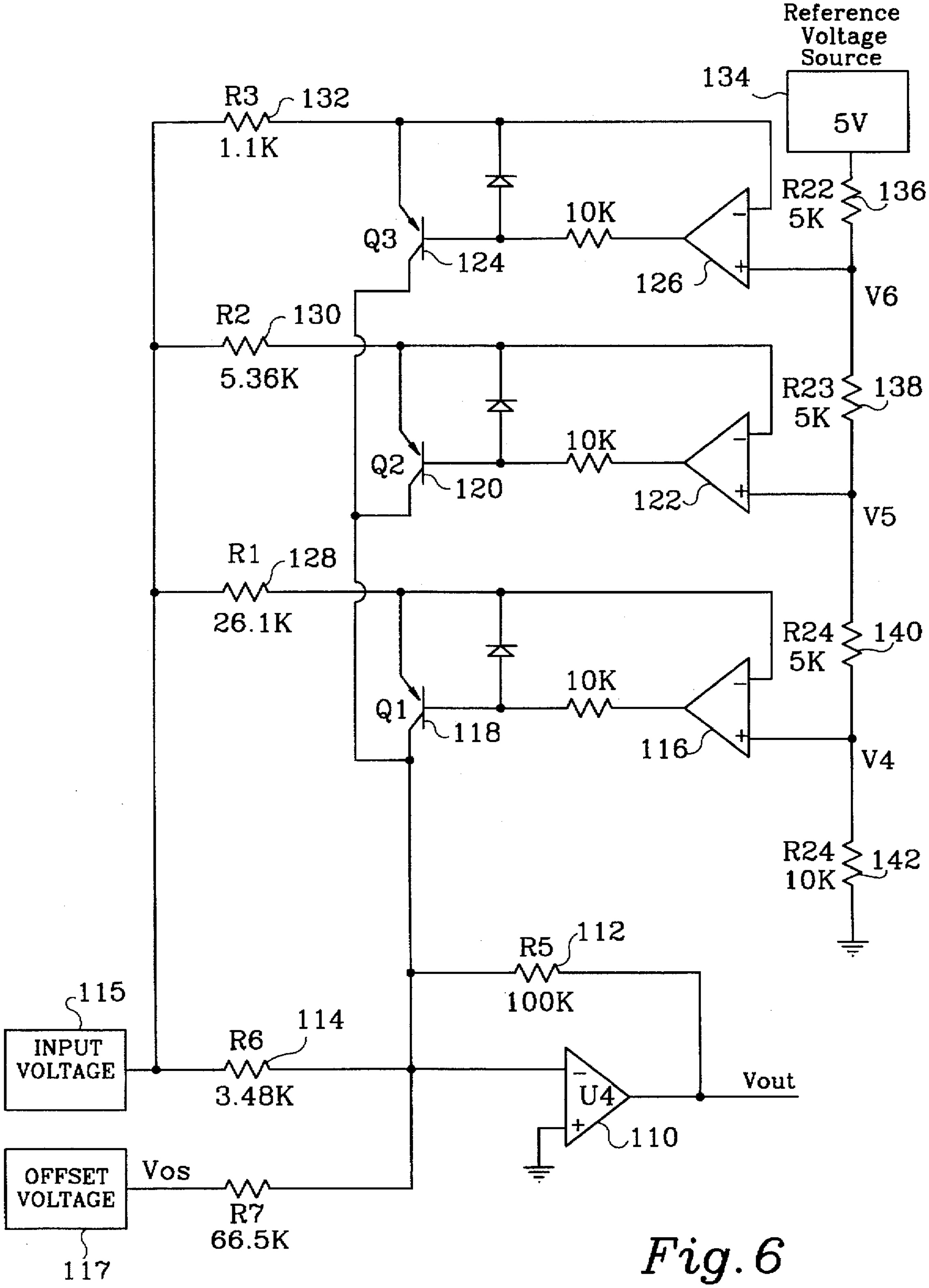
FIG. 6 is a circuit diagram of the exponential amplifier.

Disclosed in FIG. 6 is a second embodiment of the invention. Described herein is an amplifier which in response to a linear input signal outputs a piece-wise approximation of an exponential function. The exponential amplifier includes an op amp 110 which has an inverting and non-inverting input. At the inverting input of 110 is the input voltage ($V_{in}$) 115, the offset voltage 117, as well as certain feedback signals. The input voltage is the linear adjustment signal received from an external source such as the intensity adjustment 92. The output voltage of op amp 110 is transmitted to the pulse width modulator 96. Positioned in the feedback loop to the inverting input of the op amp, is resistor 112. The magnitude of this resistor and resistor 114 controls the gain of first stage op amp 110.

The circuit in FIG. 6 also shows three additional stages for the exponential amplifier. Depending on the desired accuracy of the circuit, as many stages as necessary can be added. In direct connection with the input voltage are resistors 114, 128, 130, and 132. The input voltage runs through these resistors and is received at the inverting inputs of op amps 116, 122, and 126. Received at the non-inverting inputs of op amps 116, 122, and 126, is a reference voltage which is provided by reference voltage source 134. The appropriate reference voltage for each stage is provided as a function of the voltage drop across resistors 136, 138, 140, and 142. The output of op amps 116, 122, and 126, are received at the base of transistors 118, 120, and 124, respectively. The collectors of each of the transistors are connected to the inverting input of the first stage op amp 110.

The exponential amplifier shown in FIG. 6 is a variable gain circuit. The gain of the circuit is dependent on the amplitude of the input voltage. If the amplitude of the input voltage increases, the gain applied to the signal further increases. The embodiment of the circuit shown in FIG. 6 has four discreet gain stages. Each gain stage generates a line segment in a piece-wise linear approximation of an exponential function. Gain stages can be added or removed, depending on the desired accuracy of the approximation. Each additional gain stage for the circuit in FIG. 6 requires a reference voltage. The reference voltages at the non-inverting inputs of op amps 116, 122, and 126 are determined by the resistor values of 140, 138, 136 and 142. Assuming the reference voltage is 5 volts, and using the resistor values shown in FIG. 6, the calculated reference voltages are: 2 volts at the non-inverting input of op amp 116 (V4), 3 volts at the non-inverting input of op amp 122 (V5), and 4 volts at the non-inverting input of op amp 126 (V6).

This circuit operates by applying a gain to the inverting input of op amp 110. The input voltage 115 is applied to resistor 128 and is present at the inverting input of op amp 116. The non-inverting input of op amp 116 is driven by V4. When the voltage at the non-inverting input of op amp 116 is greater than the voltage at the inverting input, the output of the op amp rises to positive rail. Under these conditions, transistor 118 is reverse-biased and does not contribute any current into the summing junction on the inverting input of first stage op amp 110. Similarly, transistors 120 and 124 are reverse biased and do not contribute any current into the summing junction of the first input of first stage op amp 110. When the input voltage is less than V4, the gain of op amp 110 is a function of resistors 112 and 114.

When the input voltage is greater than V4, but less than V5, the first gain breakpoint is active. Op amp 116 begins driving the base of transistor 118, forward biasing the base-emitter junction until transistor 118 emitter voltage is equal to V4. Current from the input voltage 115 flows through resistor 128 and transistor 118 into the inverting input of op amp 110. Since the input voltage is less than V5, transistors 120 and 124 are still reverse-biased and do not contribute any current into the inverting input of op amp 110. As a result, the gain of op amp 110 is a function of resistors 112, 114, and 128.

When the input voltage is greater than V5 but less than V6, the first and second gain breakpoints are active. Op amp 116 continues to drive the base of transistor 118, regulating the voltage on the transistor emitter to V4. Op amp 122 begins driving the base of transistor 120, forward biasing the base emitter junction until the transistor 120 emitter voltage is equal to V5. Current from the input voltage continues to flow through resistor 128 and transistor 118 into the inverting input of op amp 110. Current also flows through resistor 130 and transistor 120 into the inverting input of op amp 110. Since the input voltage is less than V6, transistor 124 is still reverse-biased and does not contribute any current into the inverting input of op amp 110. As a result, the gain of op amp 110 is a function of resistors 112, 114, 128, and 130.

When the input voltage is greater than V6, all three gain breakpoints are active. Op amp 116 continues to drive the base of transistor 118, regulating voltage on the transistor emitter to V4. Op amp 122 continues to drive the base of transistor 120, regulating the voltage on the transistor emitter to V5. Op amp 126 drives the base of transistor 124 forward biasing the base emitter junction, until the transistor emitter voltage is equal to V6. Current from the input voltage 115 continues to flow through resistor 128, transistor 118, resistor 130, transistor 120, into the inverting input of op amp 110. Also flowing into the inverting input of op amp 110 is current from the output of op amp 110 through resistor 112. Current also flows through resistor 132 and transistor 124. As a result, the gain of op amp 110 is a function of resistors 112, 114, 128, 130, and 132.

Figure 7:
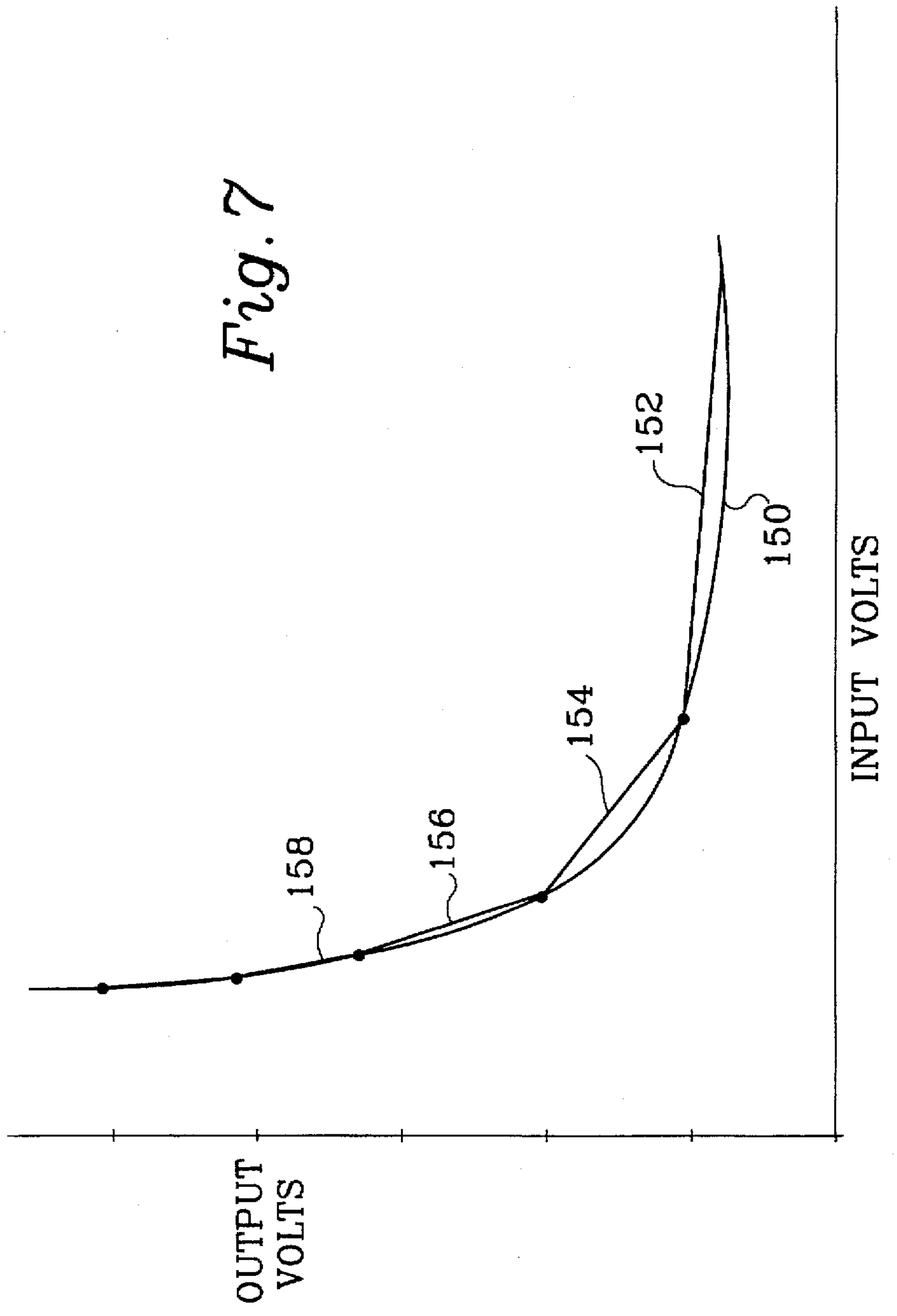
FIG. 7 is a graph comparing the output of the exponential amplifier with an ideal exponential curve.

The transfer function of the circuit for an input voltage of zero to −5 volts is plotted along with the ideal exponential curve 150 in the graph of FIG. 7. The output of the circuit is plotted along the Y axis with the input to the circuit plotted along the X axis. Line segment 152 in the graph shows performance of the circuit when only resistors 112 and 114 control the gain of the op amp 110 and none of the transistors in the circuit are turned on. Line segment 154 shows the operation of the circuit after the first gain breakpoint is active and transistor 118 is conducting current to the inverting input of op amp 110. At this point the gain of the circuit is controlled by resistors 112, 114, and 128. Line segment 156 shows the operation of the circuit when the first and second gain breakpoints are active. Current is conducted through both transistors 118 and 120 and the gain of the circuit is controlled by resistors 112, 114, 128, and 130. Finally, line segment 158 shows the operation of the circuit when the first, second, and third gain breakpoints are active. Current is conducted through transistors 118, 120, and 124, and the gain of op amp 110 is controlled by resistors 112, 114, 128, 130, and 132. As can be seen in the graph, each stage of the circuit changes the slope of the output of op amp 110 such that the combination of the linear segments closely approximates an exponential function.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An amplifier which converts a linear input signal to a nonlinear output through a piece-wise linear approximation comprising:

a first stage which comprises:

a first stage op amp with a non-inverting input at ground, an inverting input connected which receives the linear input signal and an offset voltage, and an output;

a feed back resistor connected between the output of the first stage op amp and the inverting input of the first stage op amp, which controls the gain of the first stage op amp; and an offset voltage source connected to a junction point; and at least one additional gain stage, each of the additional gain stages comprising:

an additional stage op amp with an inverting input, a non-inverting input, and an output;

a gain control resistor between the first additional stage op amp output and the op amp inverting input;

a reference voltage source which inputs to the non-inverting input of the additional stage op amp; and a switching means connected to the first stage through the gain control resistor wherein the switching means is activated when the voltage at the inverting input of the additional stage op amp is greater than the reference voltage at the non-inverting input of the additional stage op amp, the switching means directs the current flowing through the gain control resistor to the inverting input of the first stage op amp which changes the gain of the first stage op amp.

2. The amplifier of claim 1 wherein the nonlinear output approximates a nonlinear function with a constantly decreasing slope.

3. The amplifier of claim 2 wherein the switching means of each of the additional gain states is connected to the output of the first stage op amp, and the switching means is activated when the output voltage received at the input of the additional stage op amp is greater than the reference voltage at the non-inverting input of the additional stage op amp, the switching means directs the current flowing through the gain control resistor to the inverting input of the first stage op amp.

4. The amplifier of claim 1 wherein the output approximates a nonlinear function with a constantly increasing slope.

5. The amplifier of claim 1 wherein the switching means of each of the additional gain states is connected to the output of the first stage op amp, and the switching means is activated when the output voltage received at the input of the additional stage op amp is greater than the reference voltage at the non-inverting input of the additional stage op amp, the switching means directs the current flowing through the gain control resistor to the inverting input of the first stage op amp.

6. The amplifier of claim 1 wherein the switching means are transistors.

7. The amplifier of claim 1 wherein the amplifier is used to control brightness on a display.

8. The amplifier of claim 1 comprising three additional gain stages, creating four linear piece-wise segments to approximate the log function.

9. A dimming control system for a fluorescent light comprising:

a manual input means for adjusting brightness of the fluorescent light;

a pulse width modulating means which in response to the manual input means periodically output pulses with a width proportional to the brightness of the fluorescent light;

an invertor in contact with the pulse width modulator which translates the output pulses into a power signal which drives the fluorescent light;

a light sensor proximate to the fluorescent light which provides optical feedback based on the brightness of the fluorescent light; and an amplifier in contact with the pulse width modulator which converts a linear input signal to a nonlinear output through a piece-wise linear approximation, said amplifier comprising:

a first stage which comprises:

a first stage op amp with a non-inverting input at ground, an inverting input connected which receives the linear input signal and an offset voltage, and an output;

a feed back resistor connected between the output of the first stage op amp and the inverting input of the first stage op amp, which controls the gain of the output voltage; and an offset voltage source connected to a junction point; and at least one additional gain stage, each of the additional gain stages comprising:

an additional stage op amp with an inverting input, a non-inverting input, and an output;

a gain control resistor between the first additional stage op amp output and the additional stage op amp inverting input;

a reference voltage source which inputs to the non-inverting input of the additional stage op amp; and a switching means connected to the first stage through the gain control resistor wherein the switching means is activated when the voltage at the inverting input of the additional stage op amp is greater than the reference voltage at the non-inverting input of the additional stage op amp, the switching means directs the current flowing through the gain control resistor to the inverting input of the first stage op amp.

10. The amplifier of claim 9 wherein the nonlinear output approximates a nonlinear function with a constantly decreasing slope.

11. The amplifier of claim 10 wherein the switching means of each of the additional gain states is connected to the output of the first stage op amp, and the switching means is activated when the output voltage received at the input of the additional stage op amp is greater than the reference voltage at the non-inverting input of the additional stage op amp, the switching means directs the current flowing through the gain control resistor to the inverting input of the first stage op amp.

12. The amplifier of claim 11 comprising three additional gain stages, creating four linear piece-wise segments to approximate the log function.

13. The amplifier of claim 9 wherein the output approximates a nonlinear function with a constantly increasing slope.

14. The amplifier of claim 13 wherein the switching means of each of the additional gain states is connected to the output of the first stage op amp, and the switching means is activated when the output voltage received at the input of the additional stage op amp is greater than the reference voltage at the non-inverting input of the additional stage op amp, the switching means directs the current flowing through the gain control resistor to the inverting input of the first stage op amp.

15. The amplifier of claim 14 comprising three additional gain stages, creating four linear piece-wise segments to approximate the exponential function.

16. The amplifier of claim 9 wherein the switching means are transistors.

* * * * *